(12) United States Patent
Fleury et al.

(10) Patent No.: US 7,302,373 B2
(45) Date of Patent: Nov. 27, 2007

(54) SYSTEM AND METHOD FOR VISUALIZING DATA IN A THREE-DIMENSIONAL SCENE

(75) Inventors: Simon G. Fleury, Ithaca, NY (US);
Igor Terentyev, Houston, TX (US);
Denis Heliot, Sugar Land, TX (US)

(73) Assignee: Schlumberger Technology Corporation

( * ) Notice: Subject to any disclaimer, the term of this patent is extended or adjusted under 35 U.S.C. 154(b) by 637 days.

(21) Appl. No.: 10/604,062

(22) Filed: Jun. 24, 2003

(65) Prior Publication Data

US 2004/0204855 A1    Oct. 14, 2004

Related U.S. Application Data

(60) Provisional application No. 60/462,131, filed on Apr. 11, 2003.

(51) Int. Cl.
  *G06G 7/48* (2006.01)
(52) U.S. Cl. .............. 703/10; 702/6; 702/16; 345/419; 345/589; 345/629
(58) Field of Classification Search ............. 703/10
   See application file for complete search history.

(56) References Cited

U.S. PATENT DOCUMENTS

| | | | | |
|---|---|---|---|---|
| 4,467,461 | A * | 8/1984 | Rice | 367/70 |
| 6,078,867 | A * | 6/2000 | Plumb et al. | 702/6 |
| 6,606,089 | B1 * | 8/2003 | Margadant | 345/419 |
| 6,665,117 | B2 * | 12/2003 | Neff et al. | 359/451 |
| 6,801,197 | B2 * | 10/2004 | Sanstrom | 345/419 |
| 6,950,751 | B2 * | 9/2005 | Knobloch | 702/16 |
| 2001/0006387 | A1 | 7/2001 | Bennis et al. | |
| 2002/0050989 | A1 | 5/2002 | Sanstrom | |

OTHER PUBLICATIONS

Austin et al "Application of 3D Visualization Software to Reservoir Simulation Post-Processing", SPE 24433, 1992.*
Bryant et al "Reservoir Description for Optimal Placement of Horizontal Wells", SPE 35521, 1996.*
Matsumoto et al "A Computer Aided Reservoir Engineering (CARE) System: From XY Plots to 3D Animations", OSEA 88184, 1988.*
Janpieter "Analysis and Modeling of Fractured Reservoirs" SPE 50570, 1998.*
http://www.tigress.co.uk/products/geology/geology.html [As available Jan. 15, 2003, retrieved via archive.org].
http://www.sis.slb.com/content/software/reservoir/geoframe/visualization/geoviz_explore.asp [As available Feb. 20, 2003, retrieved via archive.org].

* cited by examiner

*Primary Examiner*—Paul Rodriguez
*Assistant Examiner*—Mary C. Jacob
(74) *Attorney, Agent, or Firm*—Damta J. M. Maseles

(57) ABSTRACT

A method for displaying a plurality of measurement data along a borehole trajectory includes displaying a borehole model representing the borehole trajectory; and displaying the plurality of measurement data as at least one layer overlaying the borehole model, wherein the plurality of measurement data are displayed at measurement depths corresponding to measurement depths of the borehole model.

34 Claims, 12 Drawing Sheets

SYSTEM AND METHOD FOR VISUALIZING DATA IN A THREE-DIMENSIONAL SCENE

CROSS REFERENCE TO RELATED APPLICATIONS

This invention claims priority pursuant to 35 U.S.C. § 119 of U.S. Provisional Patent Application Ser. No. 60/462,131 filed on Apr. 11, 2003. This Provisional Application is hereby incorporated by reference in its entirety.

BACKGROUND OF INVENTION

1. Field of the Invention

The present invention relates to methods for displaying and manipulating multi-layer data displayed on a three-dimensional object.

2. Background of the Invention

Determining properties of a subsurface earth formation is a critical element in maximizing the profitability of oil and gas exploration and production. In order to improve oil, gas, and water exploration, drilling, and production operations, it is necessary to gather as much information as possible on the properties of the underground earth formations as well as the environment in which drilling takes place. Thus, well logging typically produces a large amount of information that needs to be analyzed to provide insights into the formation properties. The data to be analyzed are typically derived from logging operations using different instruments to probe various geophysical properties. Each of these instruments may generate an enormous amount of data, rendering analysis difficult. In addition, it is often necessary to compare and contrast data from different measurements to gain insights into the formation properties. Accordingly, a method that facilitate such comparison is desirable.

For example, neutron tools are often used to provide information on formation porosity because formation liquids in pores interact with neutrons. However, both water and hydrocarbons produce signals in neutron measurements. As a result, neutron logging data by themselves cannot reveal which pores contain water and which contain hydrocarbons. On the other hand, resistivity tools can easily differentiate whether a formation fluid is water or hydrocarbons, due to the high contrast in resistivity/conductivity in these two types of liquids. A combined use of these two measurements can readily provide information as to which pores contain hydrocarbons. In order to derive useful information from various formation logging data, these measurement data are typically presented in strip charts ("tracks") and aligned side by side for analysis.

FIG. 1 shows a typical prior art method for presenting a plurality of logging data side-by-side tracks for analysis. The presentation shown in FIG. 1 is a standard format prescribed in, for example, Standard Practice 31A, published by the American Petroleum Institute, Washington, D. C. In this example, tracks 50, 54, 56 each include a header 57 which indicates the data types corresponding to curves 51, 53, 55, 59 presented in each track. Well log data are typically recorded with reference to the depth of the well. A depth ruler 52, which shows the measured depth (MD, the depth from the top of the well) of the data, is typically included in the graph as shown in FIG. 1 to provide a representation of the well.

Curves 51, 53, 55, 59 shown in FIG. 1 may include "raw" data recorded by well log instruments (e.g., detected voltages, detector counts, etc.) or more commonly values of parameters of interest (e.g., gamma density, neutron porosity, resistivity, acoustic travel time, etc.) derived from the raw data. In addition, some of these data may have been corrected for environmental effects.

As shown in FIG. 1, curves 51, 53, 55, 59 in tracks 50, 54, 56 do not lend themselves to intuitive interpretation by a user. In addition, representing a well in one dimension (as a function of depth) may obscure valuable information that is dependent on the geometry of the well or the size of the borehole. For example, many logging measurements are sensitive to tool standoffs. As a result, borehole washout, rugosity, or a dog leg in a borehole would introduce artifacts into the measurement data that may not be detected if no information on the borehole geometry is available.

Furthermore, many logging instruments are capable of different depths of investigation (DOI), i.e., various distances (radial depths) from the borehole wall into the formation. For example, propagation type resistivity tools can be used to probe formation resistivities at different DOI by varying the operational frequencies. Similarly, nuclear magnetic instruments can probe the formations at different DOI by using magnetic field gradients. Measurements at different DOI may provide, for example, better images of the formation surrounding the borehole or provide information regarding drilling fluid or fines invasion into the formation. A one-dimensional representation of a borehole cannot provide a proper perspective of these three-dimensional properties.

Therefore, it is desirable to have apparatus and methods for displaying multiple data sets related to a three-dimensional (3D) object (e.g., a well trajectory) in a manner that facilitates analysis of multiple data sets related to the 3D object and permits a proper perception of a geometrical relationship between the data and the 3D object.

SUMMARY OF INVENTION

In one aspect, embodiments of the present invention relate to methods for displaying a plurality of measurement data along a borehole trajectory. A method in accordance with the invention includes displaying a borehole model representing the borehole trajectory; and displaying the plurality of measurement data as at least one layer overlaying the borehole model, wherein the plurality of measurement data are displayed at measurement depths corresponding to measurement depths of the borehole model.

In another aspect, embodiments of the present invention relate to systems for displaying a plurality of measurement data along a borehole trajectory. A system in accordance with the invention includes a display; a computer operatively coupled to the display, the computer having a program to display a borehole model representing the borehole trajectory on the display, the program comprising instructions to enable: displaying the plurality of measurement data as at least one layer overlaying the borehole model, wherein the plurality of measurement data are displayed at measurement depths corresponding to measurement depths of the borehole model.

Other aspects and advantages of the invention will be apparent from the accompanying descriptions and drawings.

DETAILED DESCRIPTION

Embodiments of the present invention relate to visualization of 3D objects and presentation of data associated with the 3D object. The 3D objects, for example, may be borehole trajectories and a plurality of measurements may be displayed along the borehole trajectories. Graphical attributes, e.g., colors and transparency, of the displayed objects may be adjusted to facilitate the analysis of the measurement data. The plurality of measurements may be selectively displayed, thereby allowing a user access to the desired information. For example, information associated with different depths of investigation, may be selectively displayed to reveal formation properties at different distances from the borehole.

Figure 1:
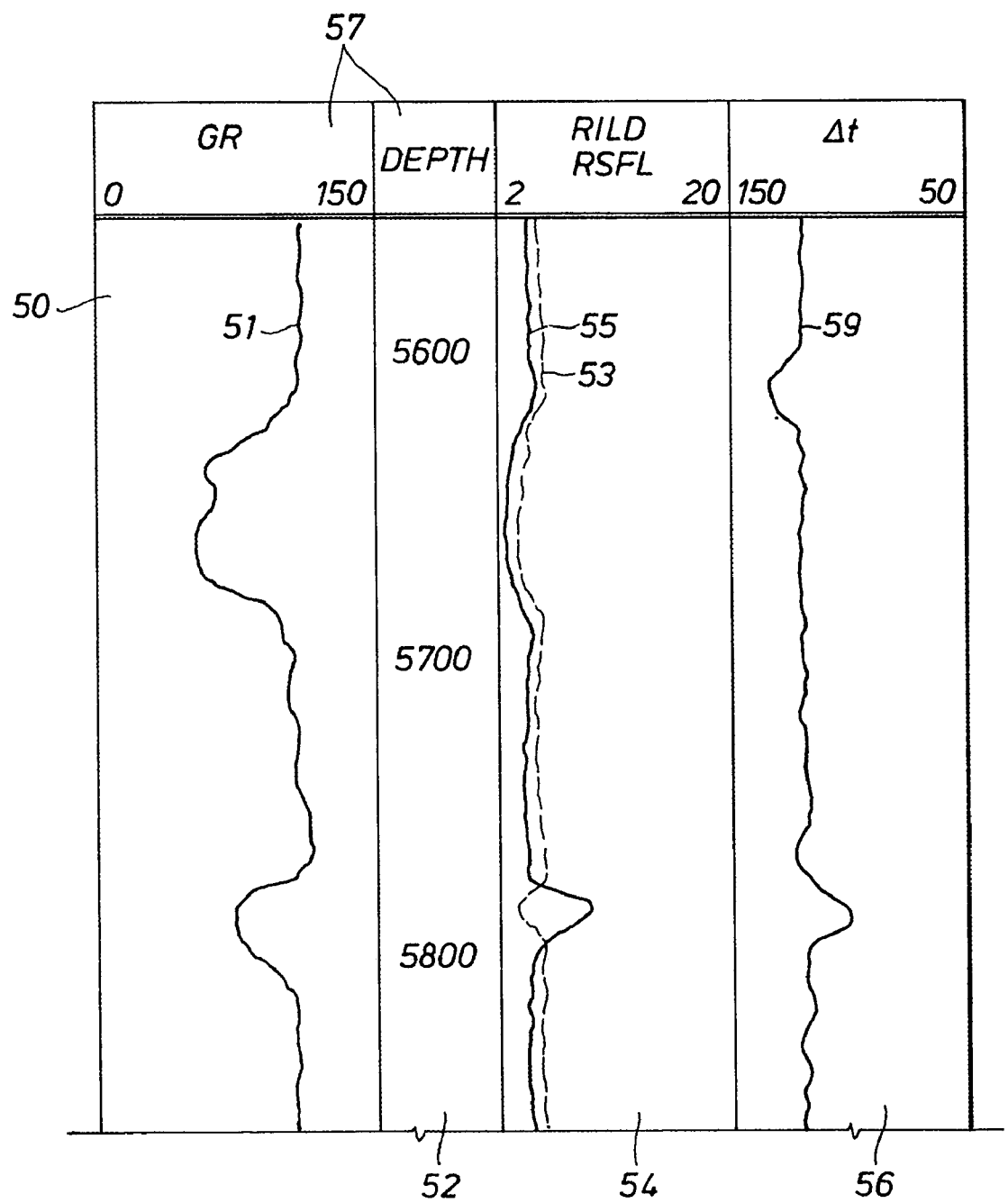
FIG. 1 shows a diagram for prior art data presentation.
Figure 2:
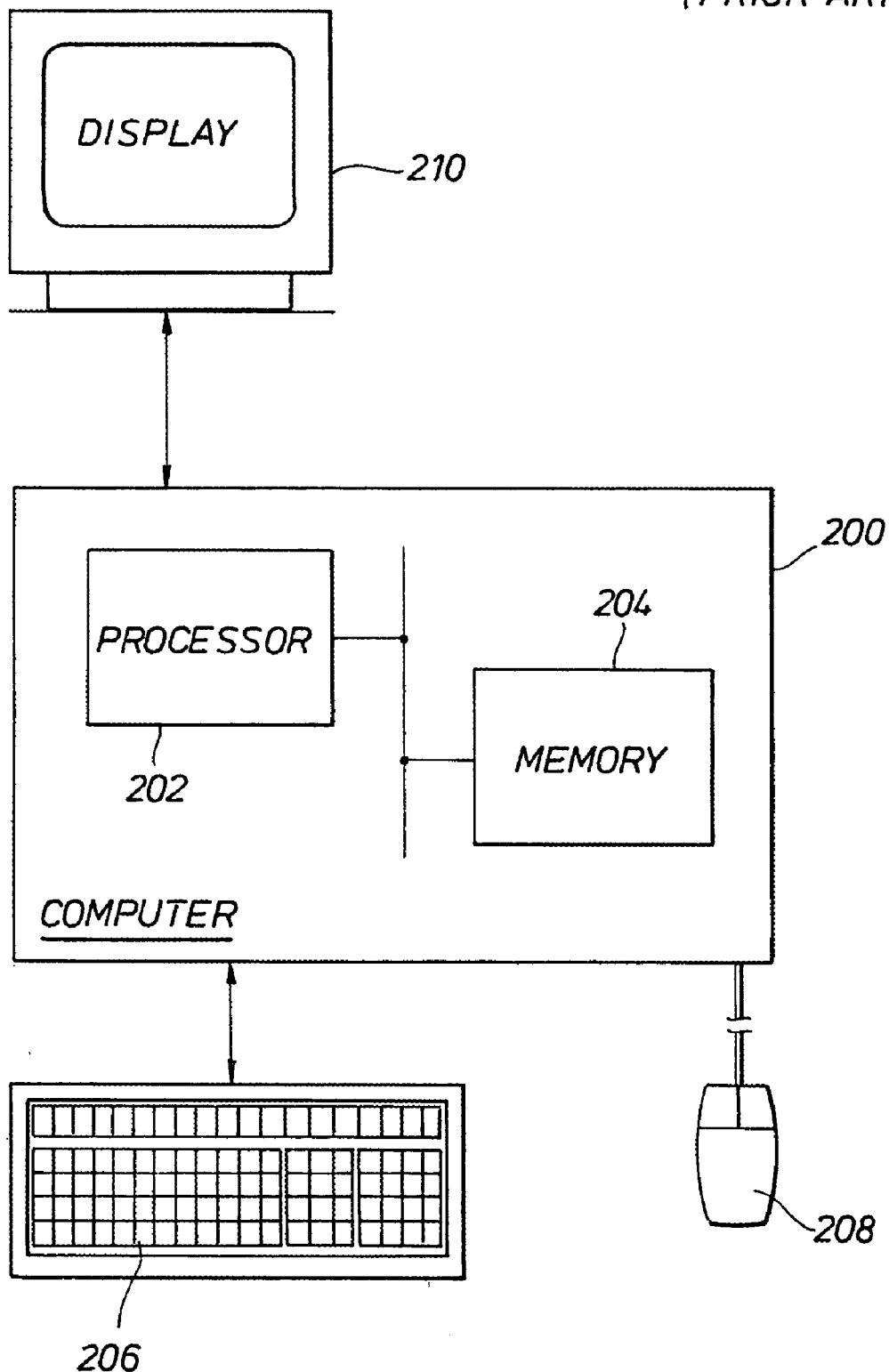
FIG. 2 shows a block diagram of a prior art computer system.

Embodiments of the invention may be implemented on any type of computer. For example, as shown in FIG. 2, a typical computer 200 includes a processor 202, associated memory 204, input means such as a keyboard 206 and a mouse 208, and an output device such as a display 210. In addition, computer 200 may include other peripherals and functionalities (not shown).

Three dimensional (3D) objects are commonly visualized on computer displays in two-dimensions (2D). Such computer displays allow users to view the 3D objects by rotating, translating, or zooming in and out of the displayed scenes. The rotation, translation, or zooming will be referred to generally as a user-requested action. Typical 3D visualization software packages respond to the user-requested actions by moving the viewpoint (observer eyes or camera) around a 3D scene. For rotation and zooming operations, these are performed with respect to a pivot point, which is typically the point of interest (POI). The POI in a typical 3D visualization software package is set at the center of the display by default.

A borehole trajectory presents special problems in 3D visualization because a borehole may be several miles long and yet its diameter is no larger than a foot. For example, it is difficult using a typical 3D visualization software package to keep the trajectory within a view area during the zooming in and out operations or other navigation around the 3D scene, which are frequently required to visualize the entire borehole and to inspect detailed information in a particular area. One approach to address this problem is disclosed in U.S. Published application US-2003-0043170-A1 published Mar. 6, 2003 by Fleury. This application is assigned to the assignee of the present invention and is hereby incorporated by reference in its entirety. The methods disclosed in the Fleury application use a reference shape to represent a 3D trajectory and to restrict the POI to travel along the reference shape. A reference shape, for example, may be a wire lying along the longitudinal axis of the borehole. Other reference shape may include a curvilinear object ("thin wire") lying slightly offset from the longitudinal axis, located on the wall of the well, or located some where outside, but near, the well. Furthermore, a reference shape may not necessarily be a "thin wire." For example, a 3D reference shape may be a cylinder (i.e., a "thick wire") or a cylindrical surface (i.e., a pipe or tube) that follows the shape of the well trajectory. The radius of such a cylinder or a cylindrical surface may be smaller than, similar to, or slightly greater than that of the well trajectory.

Another unique problem associated with analyzing a borehole arises from the necessity to display a plurality of measurement data at the same area of the borehole, preferably preserving the 3D relationship relative to the borehole. In addition, it is often desirable to be able to display only a selected group of measurement data at any time. Embodiments of the invention provide convenient methods for displaying a plurality of data (e.g., well log data) along a 3D object (e.g., a borehole trajectory) that may preserve the 3D relationship between various measurements and the 3D object.

According to some embodiments of the invention, a plurality of data may be displayed as multi-layer overlays along a 3D object. While embodiments of the invention are generally applicable to any 3D object, for clarity, the following discussion assumes the 3D object is a borehole trajectory.

Figure 3:
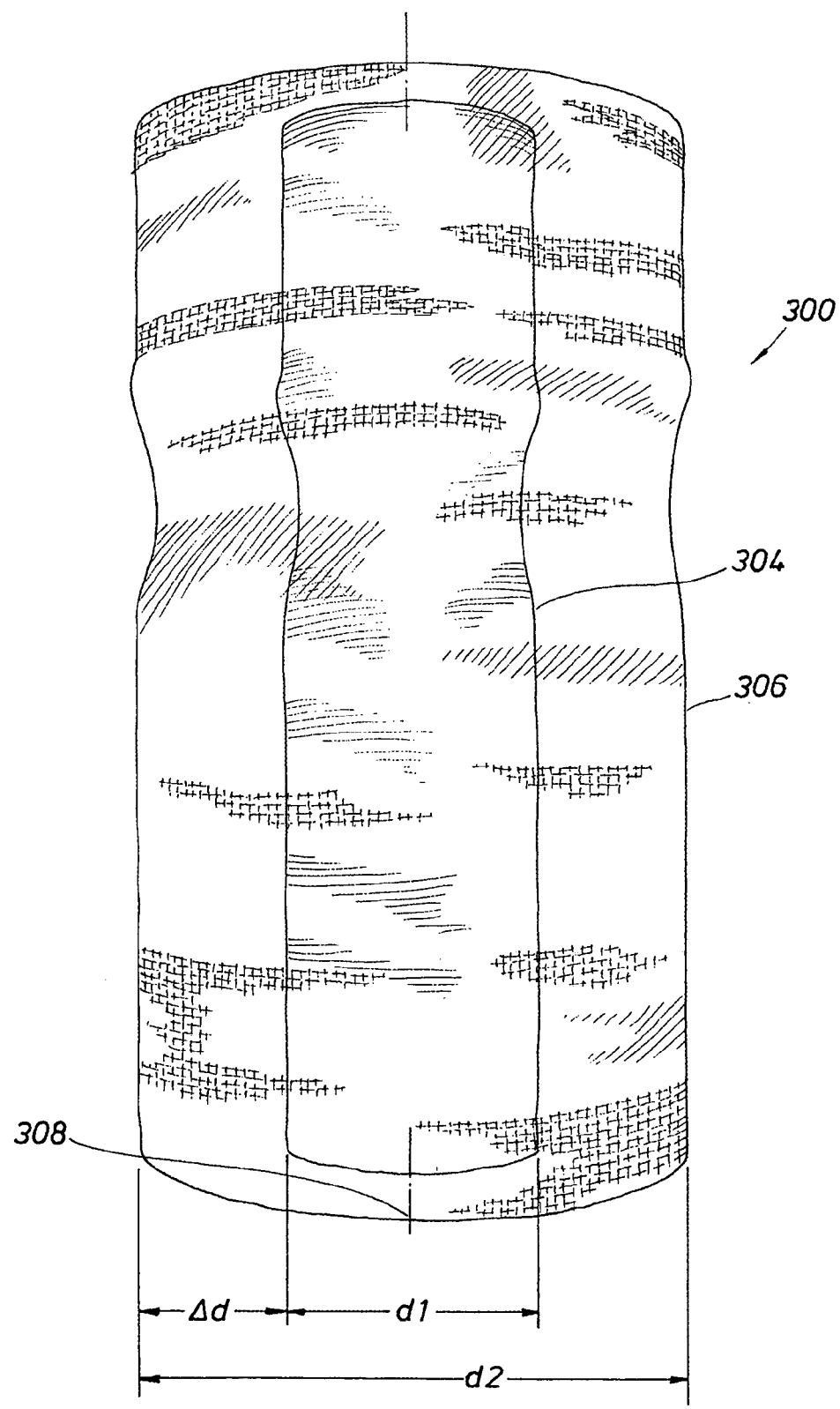
FIG. 3 shows a diagram illustrating multiple layers surrounding a borehole according to one embodiment of the invention.

FIG. 3 shows a display 300 in accordance with one embodiment of the invention, illustrating multiple layers surrounding (overlaying) a borehole. The display 300 shows only a section (e.g., a working interval) of the borehole and includes a first layer 304, which may represent the dimension of the borehole. The dimension (e.g., diameters) of the borehole may be related to the actual diameters of the borehole. The borehole diameters may be acquired using any instrument known in the art, e.g., a mechanical or sonic caliper. Alternatively, the first layer 304 may show a cylinder or cylinder segments representing the 3D object. Notably, the cylinder or cylinder segments may not be related to the true diameters of the 3D object. While the size (dimension) of the first layer 304 may represent the diameters of the borehole, the surface (or texture) of the first layer 304 may be used to represent additional information (e.g., measurement data). For example, one may use a color scheme, gray scale, or texture patterns on the surface of the 3D object to represent resistivity of the formation surrounding the borehole.

In FIG. 3, the display 300 also shows a second layer 306 representing a set of measurement data associated with the borehole. The second layer 306 is displayed in a manner such that the measurement depths (MD, distance along the borehole from the beginning of the borehole) of the measurement data correspond to those shown in the first layer 304. The measurement data may be formation log data (raw data) obtained with a logging tool (e.g., neutron count rates, gamma ray count rates, voltages from induction tools, or phase shift and attenuation from propagation tools) or processed data related to formation properties (e.g., neutron porosity, gamma density, lithology, or resistivity). In this description, "measurement data" is used to generally refer to either raw data or processed data. Similarly, "measurement value" is used to generally refer to values in the raw data or the processed data.

Both the first (e.g., borehole diameter) layer 304 and the second (e.g., measurement) layer 306 may include attributes that are either automatically set or are user controlled. For example, the first layer 304 (borehole diameter layer), may use a color scheme (or gray scale) to represent various diameter values or some measured formation property (e.g., resistivity). Similarly, the second layer 306 (measurement data) may use a color scheme (or gray scale) to represent the measured values (or formation properties). The color scheme may be automatically set or controlled by the user to represent various values. In addition, the transparency of the displayed layers may also be automatically set or user controlled.

In some embodiments, the transparency may be set according to a simple scheme to facilitate the viewing of multiple layers. For example, the inner layer may be set to be more opaque and the outer layers more transparent such that both layers are simultaneously visible to a user. In other embodiments, the transparency may be set according to selected functions that depend on measurement values being displayed. When the transparency is selected to correlate with the measurement values, it becomes easier to visually perceive the formation properties in relation to the 3D object. For example, on a layer displaying formation resistivities, transparent regions may indicate low resistivities, while opaque regions may indicate high resistivities (i.e., likely oil-bearing regions). This transparency scheme can create a visual effect that only oil-bearing regions (high resistivity regions) are visible.

Figure 4A:
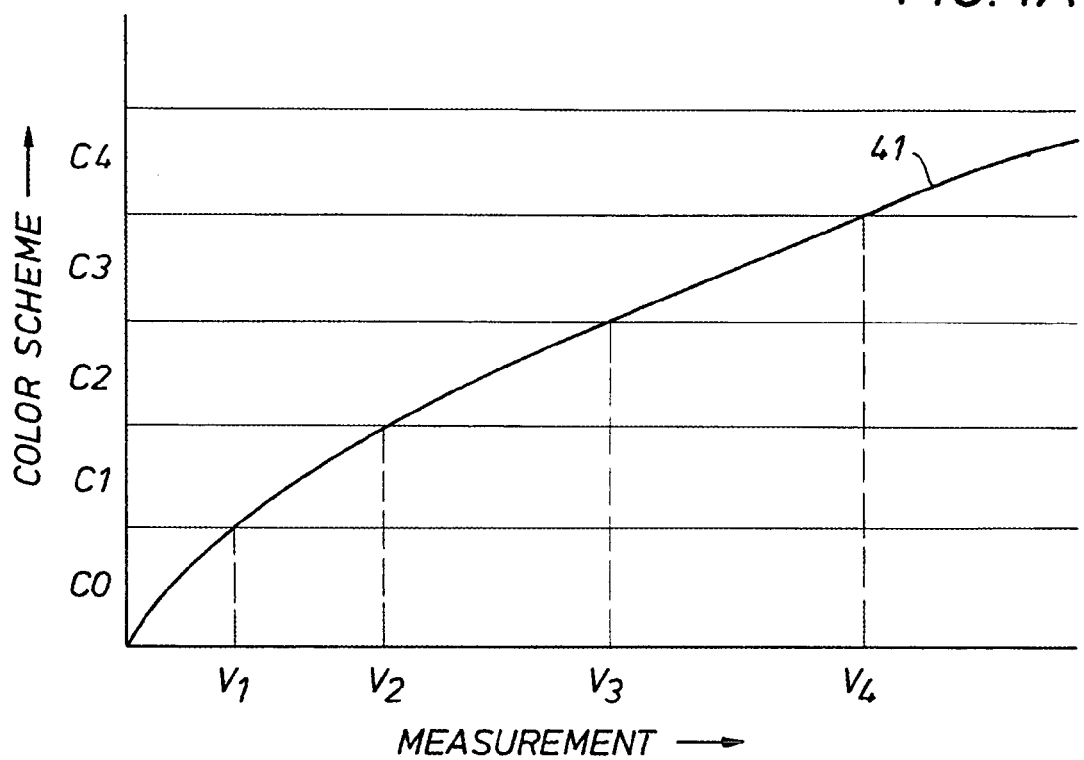
FIGS. 4A and 4B show charts illustrating exemplary functions for selecting color schemes and transparency for displaying multiple layers according to one embodiment of the invention.
Figure 4B:
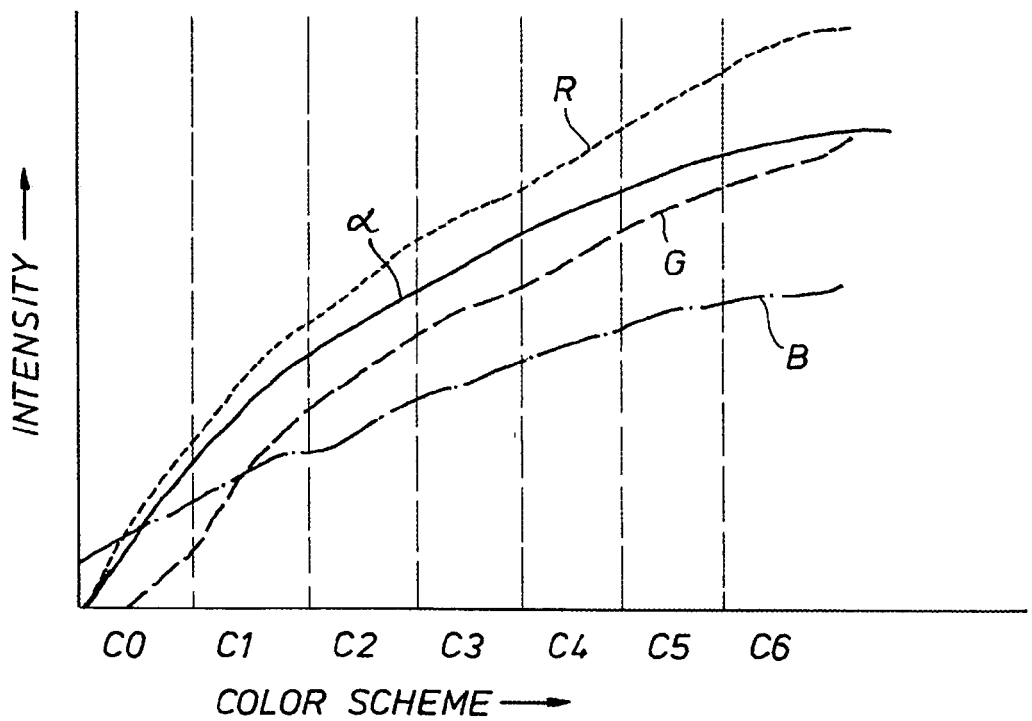

FIGS. 4A and 4B illustrate an example of how the transparency may be correlated with the displayed values. As shown in FIG. 4A, the measurement values may be correlated with a color scheme according to a selected function (shown as curve 41). For example, a measurement values less than $V_1$ is assigned a color class C0, a measurement value between $V_1$ and $V_2$ is assigned a color class C1, and so on. The attributes (red (R), green (G), and blue (B) colors, and transparency (α)) of each color class (C0, C1, C2, etc.) may be defined according to user selected functions. For example, FIG. 4B shows an example of color functions (R, G, B) and a transparency (α) function. As shown, the color functions (R,G, B) and the transparency function (α) are selected to provide progressively increasing color saturation and transparency in the color classes. One of ordinary skill in the art would appreciate that the functions shown in FIGS. 4A and 4B are for illustration only and other functions may be used without departing from the scope of the invention.

While FIG. 3 illustrates a display having two layers (i.e., a data layer and a 3D object surface layer), one of ordinary skill in the art would appreciate that the exact number of layers should not limit the present invention. For example, more layers of measurement data may be displayed over the 3D object. The different layers may be used to display measurements of different formation properties, measurements at different depth of investigation (DOI, different distance into the formation from the borehole wall), or measurements at different time (time lapse measurements). Each of the layers may be represented on a surface having the same or different radius, i.e., these layers may or may not overlap. In addition, a user may be permitted to turn the display of any particular layer on or off to further facilitate the viewing of the desired layers.

FIG. 3 shows that the second layer 306 is displayed with a larger diameter (d2) than that (d1) of the first layer 304 such that the second layer 306 is displaced from the surface of the 3D object. In an alternative embodiment, the second layer 306 may be offset from the surface of the first layer 304 by a selected distance ($\delta$) such that the surface of the second layer 306 tracks or parallels that of the first layer 304.

In some embodiments, the diameters of various layers correspond to the depths of investigation (DOI) of the respective data. Measurement data with different DOI may be obtained with, for example, induction or propagation resistivity tools or NMR tools. The ability to display the multiple layers according to their DOI makes it possible to construct a 3D model of the formation properties surrounding the borehole. In addition, being able to display measurements from various DOI makes it possible to perceive regions of mud invasion with respect to the 3D borehole trajectory. Furthermore, to facilitate the display of invasion regions, the multiple displayed layers may be set to display "difference" spectra, i.e., difference between the adjacent layers from various DOI measurements.

In one or more embodiments of the invention, the radius/diameters of the multiple layers may be controlled by the user such that some layers may be displayed on the same cylindrical surface (i.e., same diameter). In some situations, the ability to overlay two or more layers on the same surface facilitates data analysis. For example, a layer representing formation porosity data may be displayed in shades of yellow and overlaid with another layer representing formation resistivity data displayed in shades of blue. In such a display, pores that are filled with hydrocarbons may be easily identified as areas appearing in a different color due to the mixing of yellow and blue.

The ability to control the diameters of the displayed layers also permits a user to perform virtual tests before an actual operation. For example, the user may be able to select a borehole casing with a suitable diameter by fitting different sized casings in the displayed borehole trajectory. In addition, embodiments of the invention may include a program for calculating a volume between any two layers. Therefore, a user may calculate the precise amounts of cement needed to fill the annulus using virtual casings of various diameters.

In FIG. 3, a reference shape 308 is also shown as a wire lying along longitudinal axis of the well trajectory. The reference shape 308 may be used to restrict the movement of POI to ensure that the 3D object is always displayed within the viewing area.

Figure 5:
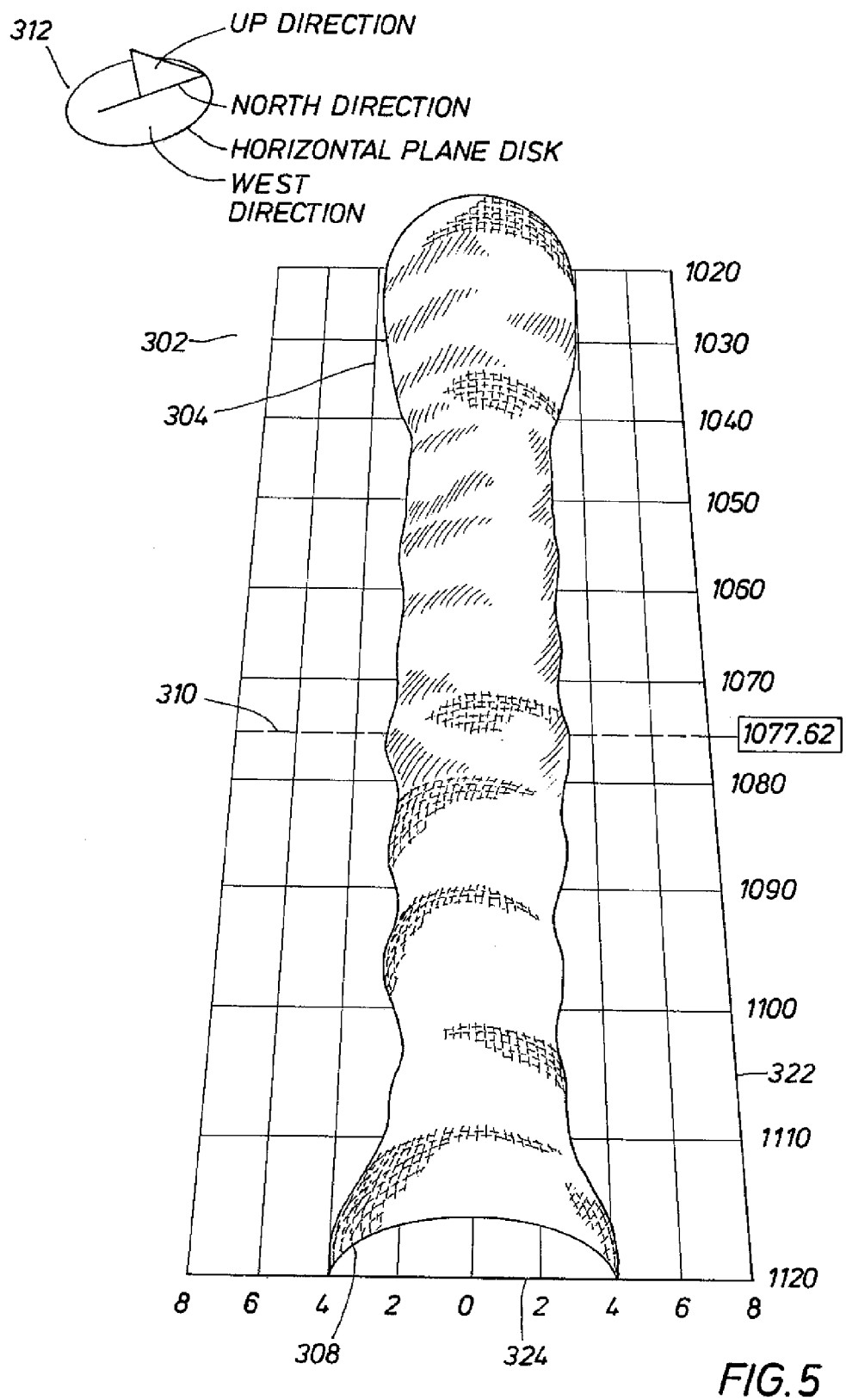
FIG. 5 shows a display illustrating measurements displayed alongside a borehole according to one embodiment of the invention.

As noted above, in addition to showing the diameters of the 3D object as the first layer 304 (as shown in FIG. 3), in one or more embodiments of the invention, a set of measurement data may also be mapped onto the surface of the 3D object. For example, FIG. 5 shows a first layer 304 that is a borehole having varying diameters. A measurement data set (e.g., resistivity of a borehole) is mapped on the borehole surface. Although only one layer is displayed in FIG. 5, one of ordinary skill in the art would appreciate that multiple layers (as shown in FIG. 3) may be added.

FIG. 5 also shows a grid 302 having on one axis an MD ruler 322 indicating measurement depths (MD) and on the other axis a diameter ruler 324 indicating borehole diameters. The grid 302 may be user-defined or automatically indexed. In addition, a cursor 310 may be provided to indicate the MD value of a point of interest (POI). As shown in FIG. 5, the MD value corresponding to cursor 310 is also shown on the MD ruler 322, and the diameter ruler 324 is aligned with a reference shape 308, which is located at the borehole axis, for easy estimation of the borehole diameters.

While FIG. 5 displays the MD value for the cursor or POI location, other values associated with the cursor or POI may also be displayed. For example, if the display layer shows the measurement values (e.g., formation resistivities), then the displayed cursor or POI value may correspond to the resistivity at that location. That is, embodiments of the invention may allow a user to select any point (cursor location) on the displayed object and display a measurement value (e.g., a resistivity) associated with the cursor location in response to the user's selection (e.g., mouse click or key board input). Having the ability to display the cursor associated measurement values makes it possible to query the measurement values at any point within the display. This provides a method to perform virtual core analysis.

The grid 302 may have user-defined attributes. For example, the grid 302 may be selectively turned "on" or "off," or have different colored lines to represent horizontal or vertical increments. Furthermore, the grid 302 may have a linear step size or a non-linear step size, e.g., log scale, depth proportional scale, POI dependent scale, etc.

In FIG. 5, a compass 312 is also displayed in one corner of the viewing area. A compass 312 may indicate the well trajectory orientation and tilt. For example, North and West directions are indicated on compass 312, which also includes a horizontal plane disk and the up direction to help orient the well trajectory to the user.

Figure 6:
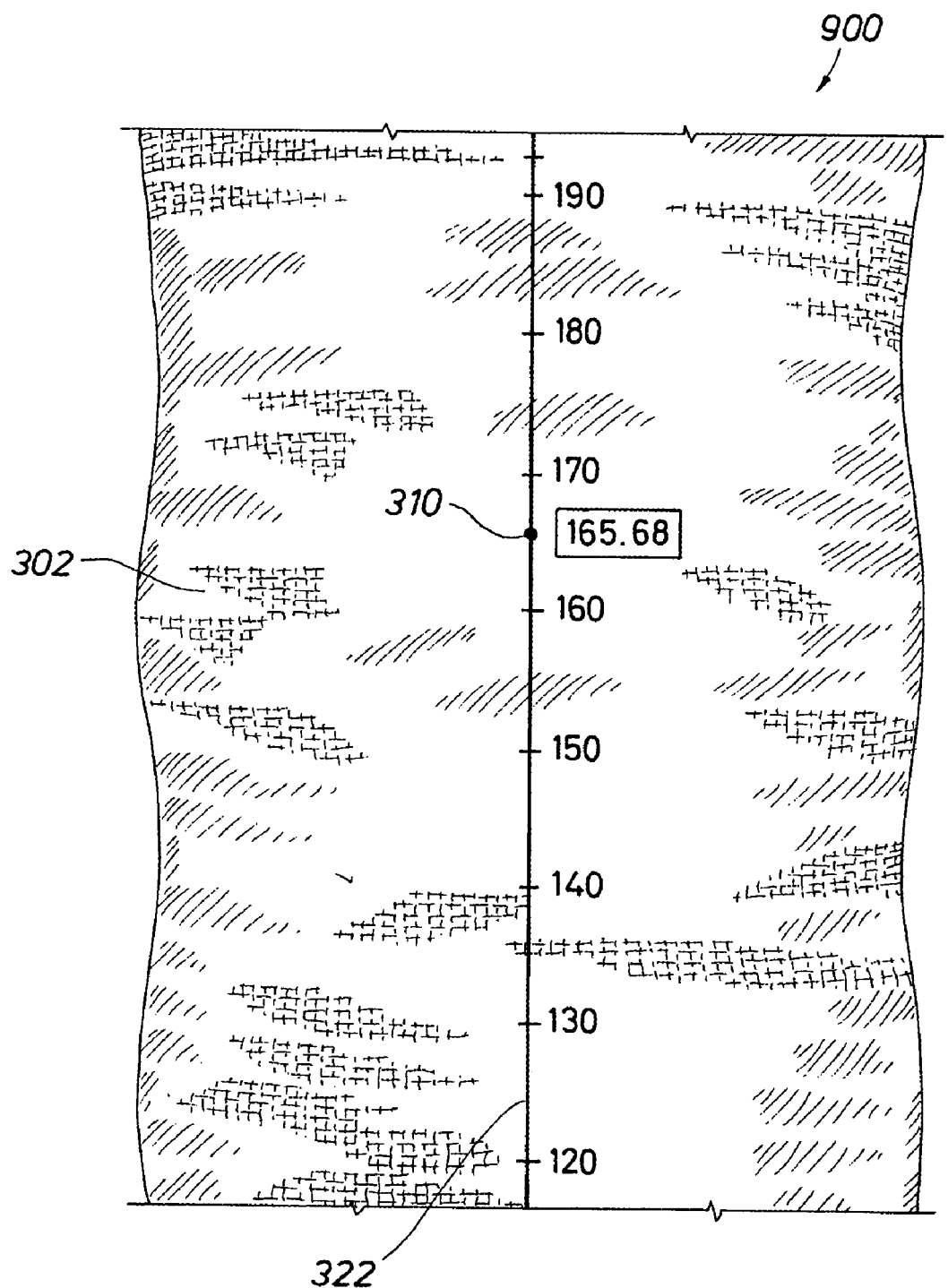
FIG. 6 shows a display illustrating measurements displayed on a borehole surface according to one embodiment of the invention.

In addition to having a grid 302 displayed next to the 3D object, as shown in FIG. 5, a grid or ruler may also be mapped onto the surface of the 3D object. For example, FIG. 6, displaying borehole surface 900, shows a ruler 322 mapped onto the borehole 302 to provide the MD information. Placing the reference grid or ruler on the 3D object is preferred when the display is "zoomed" in on the 3D object. In FIG. 6, a user-selected depth 310 (or POI) is also displayed.

Figure 7:
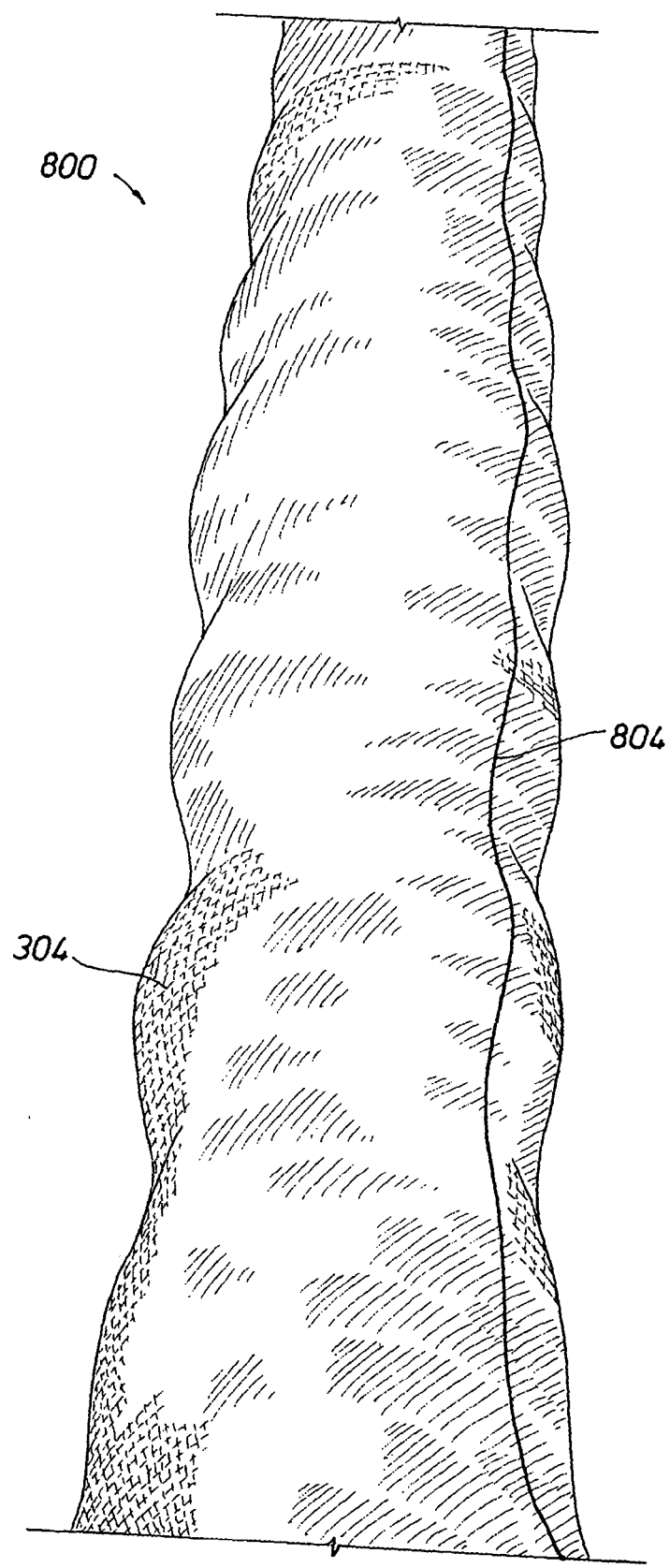
FIG. 7 shows a display illustrating a top of the hole line indicated on the surface of the borehole according to one embodiment of the invention.

Many well log data are measured with respect to azimuthal sectors (e.g., top, bottom, left, and right quadrants). To facilitate interpretation of such data, it may be helpful to have an indication regarding the azimuthal angles or the corresponding sectors (quadrants). FIG. 7 shows a display 800, illustrating orientation information (top of the hole 804) displayed alongside a borehole 304, according to one embodiment of the invention. The "top of hole" (TOH) intersection line 804 results from an intersection of the surface of the borehole 304 and a vertical plane (not shown) passing through the borehole axis (not shown). Having a top of hole 804 identified, measurements that include azimuthal information may then be properly aligned with the correct azimuthal angles. Similarly, other orientation information (e.g., intersection with a vertical plane running along the North-South direction) may also be displayed on the 3D object.

Figure 8:
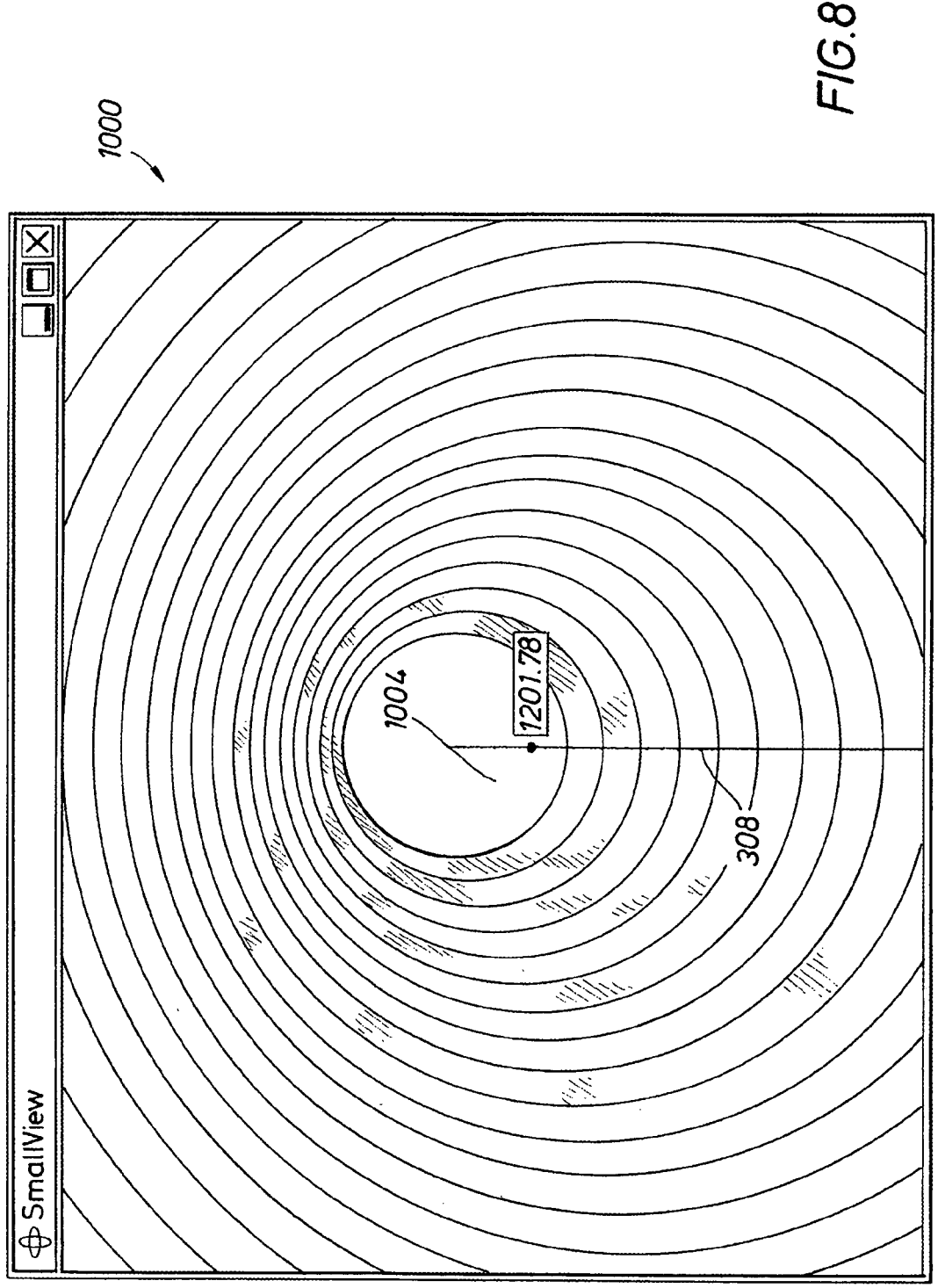
FIG. 8 shows a display illustrating a view from inside a borehole according to one embodiment of the invention.

To facilitate analysis of any particular data layer displayed, embodiments of the invention permit the movement of the POI in any location, including inside the borehole. For example, FIG. 8 shows a display 1000, in which a camera (view point) is placed inside a borehole. A reference shape 308 is also shown in this example. The reference shape 308 as shown is a wire lying along the longitudinal axis of the well trajectory. POI 1004 with its associated MD value is also displayed. This particular view is most helpful for a user to appreciated the shape and size of the borehole as seen by a logging tool during a logging operation.

A vertical borehole typically traverses sedimentation layers at a perpendicular angle. When a sedimentation layer deviates from the horizontal surface, it is said to have a dip with an angle (dip angle). A dip angle is measured relative to the horizontal surface. Thus, a dip plane typically intersects a vertical borehole at an angle other than 90 degrees. Knowing how a dip plane intersects a borehole may be important not only during drilling (e.g., for geosteering), but also in production planning.

A dip plane is typically derived from formation logging data (e.g., resistivity data) that are measured with azimuthal information. For example, using an induction or propagation tool, the axial location of formation layer boundary may be determined around the borehole. The axial depths (MD) of the layer boundary when plotted as a function of azimuthal angles manifest themselves as points defining a sine wave. Thus, fitting these points to a sine wave will provide the information regarding the angle and orientation of the dip plane. Embodiments of the invention provide an alternative approach to finding a dip plane.

Figure 9:
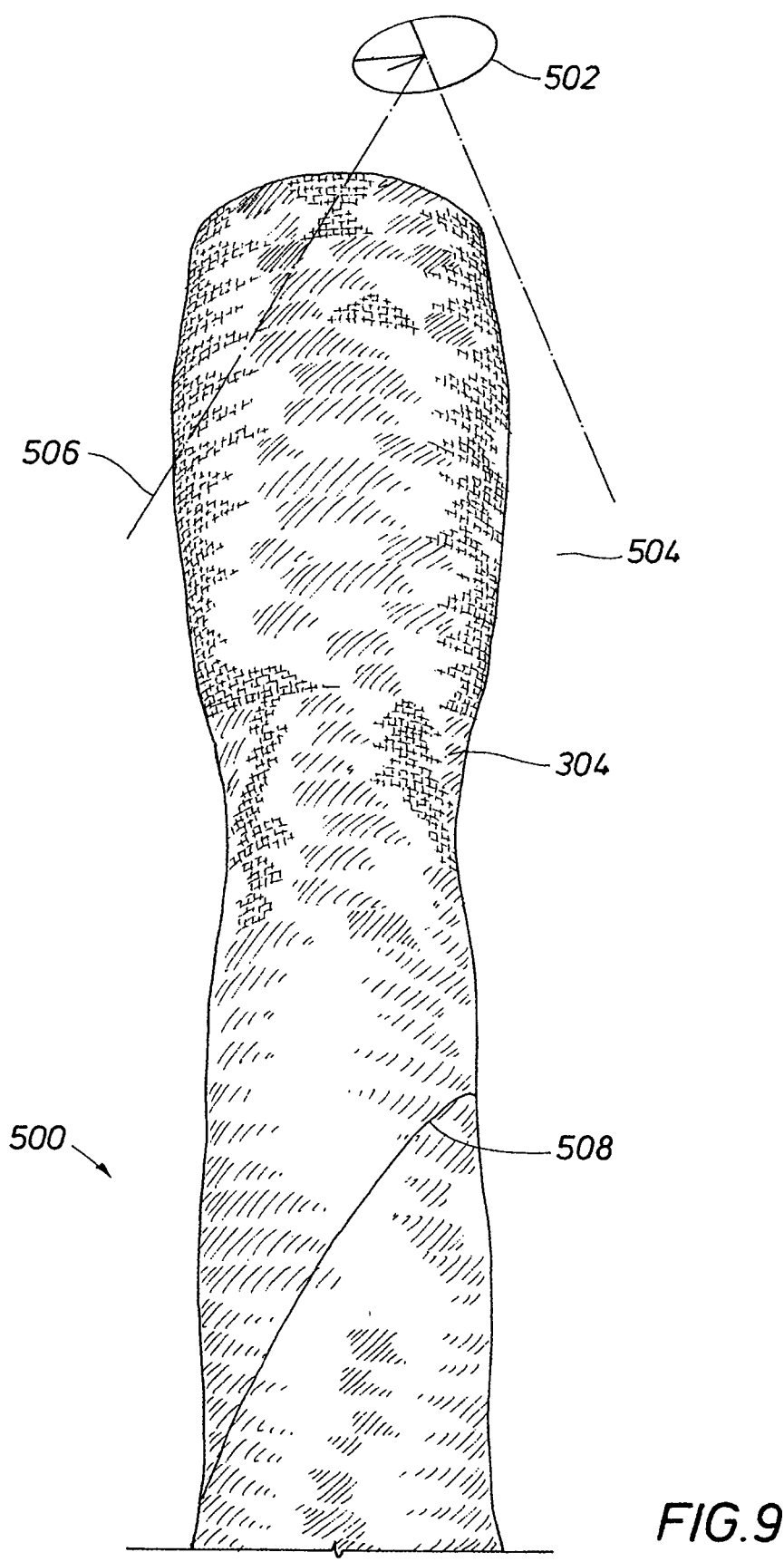
FIG. 9 shows a dip plane intersecting a borehole according to one embodiment of the invention.

FIG. 9 shows an exemplary display 500 illustrating a dip plane 504 intersecting a borehole 304. In accordance with one embodiment of the invention, a dip plane 504 may be represented as a rectangle. Dependent on a user's control inputs, attributes of a dip plane 504 may be adjusted to facilitate analysis. For example, the transparency, color of the rectangle, edge color, size, visibility, and other attributes of dip plane rectangle 504 may be adjusted. As shown in FIG. 9, the dip plane 504 is transparent except for edge line 506 and the intersection 508 with the borehole. This makes information display on the surface of the 3D object completely visible to a user. In other embodiments, the dip plane 504 may be displayed with an opaque or semi-opaque rectangle with proper specularity (e.g., light reflection) to provide a better 3D perception and an indication as to the orientation of the light source.

Figure 10:
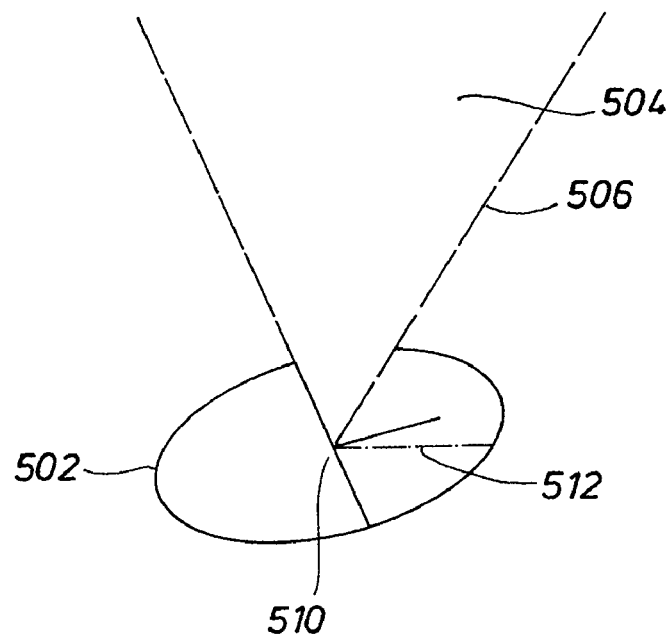
FIG. 10 shows a dip plane compass according to one embodiment of the invention.

Also shown in FIG. 9 is a dip plane compass 502 located at a corner of the dip plane 504. The dip plane compass 502 provides information related to the dip plane 504. FIG. 10 shows one embodiment of a dip plane compass 502 including a strike pattern 510 (I–) that indicates the azimuth of the intersection of the dip plane 504 with a horizontal surface. In addition, the dip plane compass 502 also includes a directional indicator (e.g., north) 512. A user will be able to derive the dip angle and the orientation of the dip plane from the strike pattern 510 and the directional indicator 512.

Some embodiments of the invention provide methods for visually fitting a dip plane based on measurement data displayed on the multiple layers. To visually fit a dip plane to the measurement data shown in multi-layer overlay according to embodiments of the invention, the dip plane 504 shown in FIG. 9 may be a general plane that permits the user to control its location along the axis of the borehole and its tilt angle relative to the axis of the borehole. In addition, the color and transparency of the plane may be controlled by the user. With the ability to manipulate such a plane, a user can visually fit the plane to measurement data that define a dip plane, i.e., performing a 3D dip plane picking instead of the conventional 2D dip plane fitting (sine wave fitting). Once the dip plane is picked, its dip angle and orientation may be calculated. An advantage of this approach is that multiple measurement data sets (e.g., voltage data from a resistivity logging tool; phase shift and attenuation from a propagation tool, etc.) may be simultaneously displayed, on the same layer or on different layers, and visually fitted at the same time to identify the dip plane.

Figure 11:
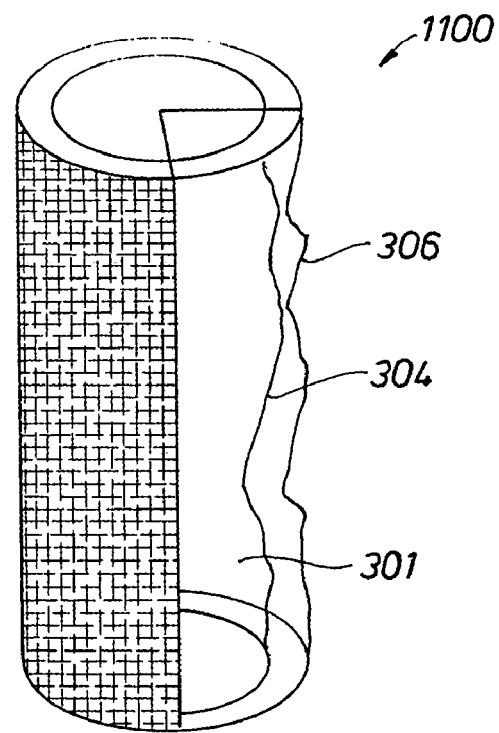
FIG. 11 shows a display of a borehole having an angular section removed according to one embodiment of the invention.

Some embodiments of the invention relate to methods for displaying multi-layer information on a 3D object in a more comprehensible manner. For example, information and/or measurement data may be better visualized if a portion of the 3D object is removed (cut out). FIG. 11 shows that an angular section of a borehole 1100 and the associated multi-layer displays is cut out. As shown, the inside 301 of the borehole becomes visible, in addition to the first layer 304 and the second layer 306. This view is particular useful if a user needs to compare the information on various layers and/or to compare these layers with the properties shown on the inside 301 of the borehole. In one embodiment, the angular section to be removed may be referenced to the user coordinate such that a different angular section will be removed when the 3D object is rotated, for example. One of ordinary skill in the art would appreciate that other variations of this method are possible without departing from the scope of the invention. For example, the angular size or orientation (relative to the borehole axis) of this cutout section may be controllable by a user, or different layers may have different angular sections cutout.

Figure 12A:
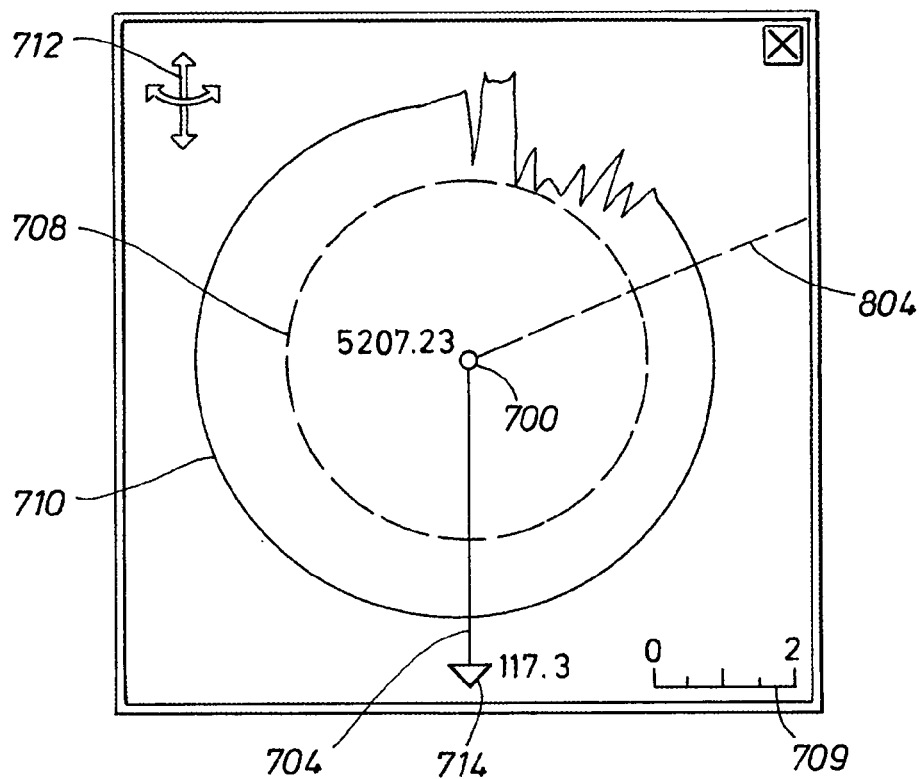
FIGS. 12A and 12B show cross-section views of the displayed layers according to one embodiment of the invention.
Figure 12B:
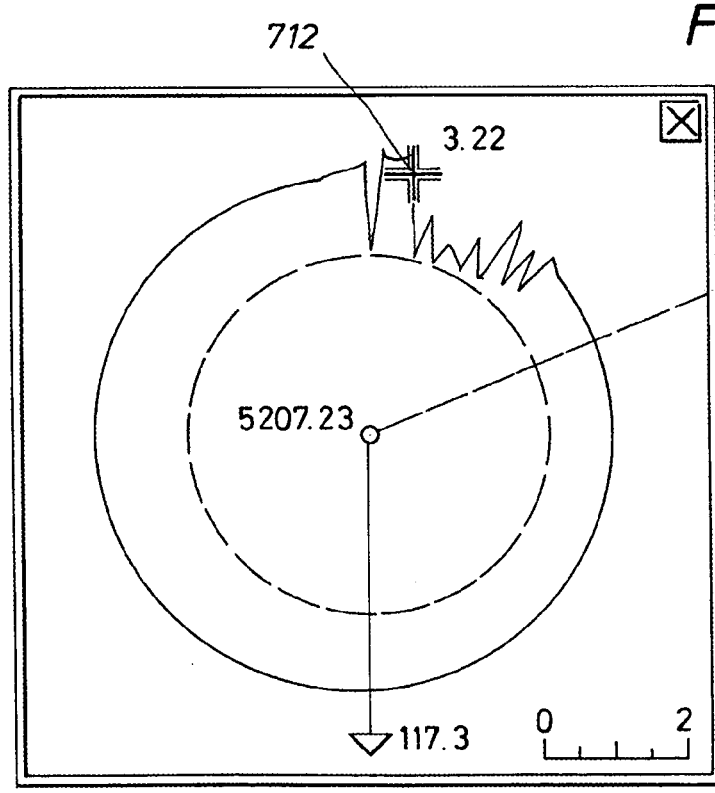

In some situations, it may be easier to comprehend the 3D scene in cross-section views. For example, when fitting a virtual casing in the borehole model as described above, it would be easier to see whether the casing properly fits the borehole in a cross-section view. FIGS. 12A and 12B show cross-section views of a multi-layer display in accordance with one embodiment of the invention.

FIG. 12A displays a cross-section view that includes a first layer borehole (caliper) surface 708 and a second layer 710 representing measurement data. The cross-section view may be implemented as a top-down image of the borehole section which includes navigational and scaling labels and information. As shown in FIG. 12A, these labels and information include a PO1 700, including the corresponding measurement depth, a North-South intersection line 704, a top-of-hole (TOH) intersection line 804 (as shown in FIG. 7), and a scale 709. The scale 709 is chosen dynamically such that the most outlying layer is included in the viewable area. In addition, an icon (e.g., the eye icon) 714 may be included to indicate the angle between the TOH line 804 and the NS line 704.

The user may navigate the cross-section scene by rotating the borehole section around its axis. As shown in FIG. 12A, when rotating the borehole section, a cursor image 712 may change to depict the current user initiated operation (the rotating of the borehole section). Further, as shown in FIG. 12B, in some embodiments, the cursor 712 may be used to depict other information (e.g., the current MD of the cross section, a radius representing a current distance of the cursor from the borehole's axis, or a value of the measurement data shown on a displayed layer). One of ordinary skill in the art would appreciate that these are examples of the displays and other modifications are possible without departing from the scope of the invention. For example, the cursor display may be visible only during a user-requested operation.

Figure 13:
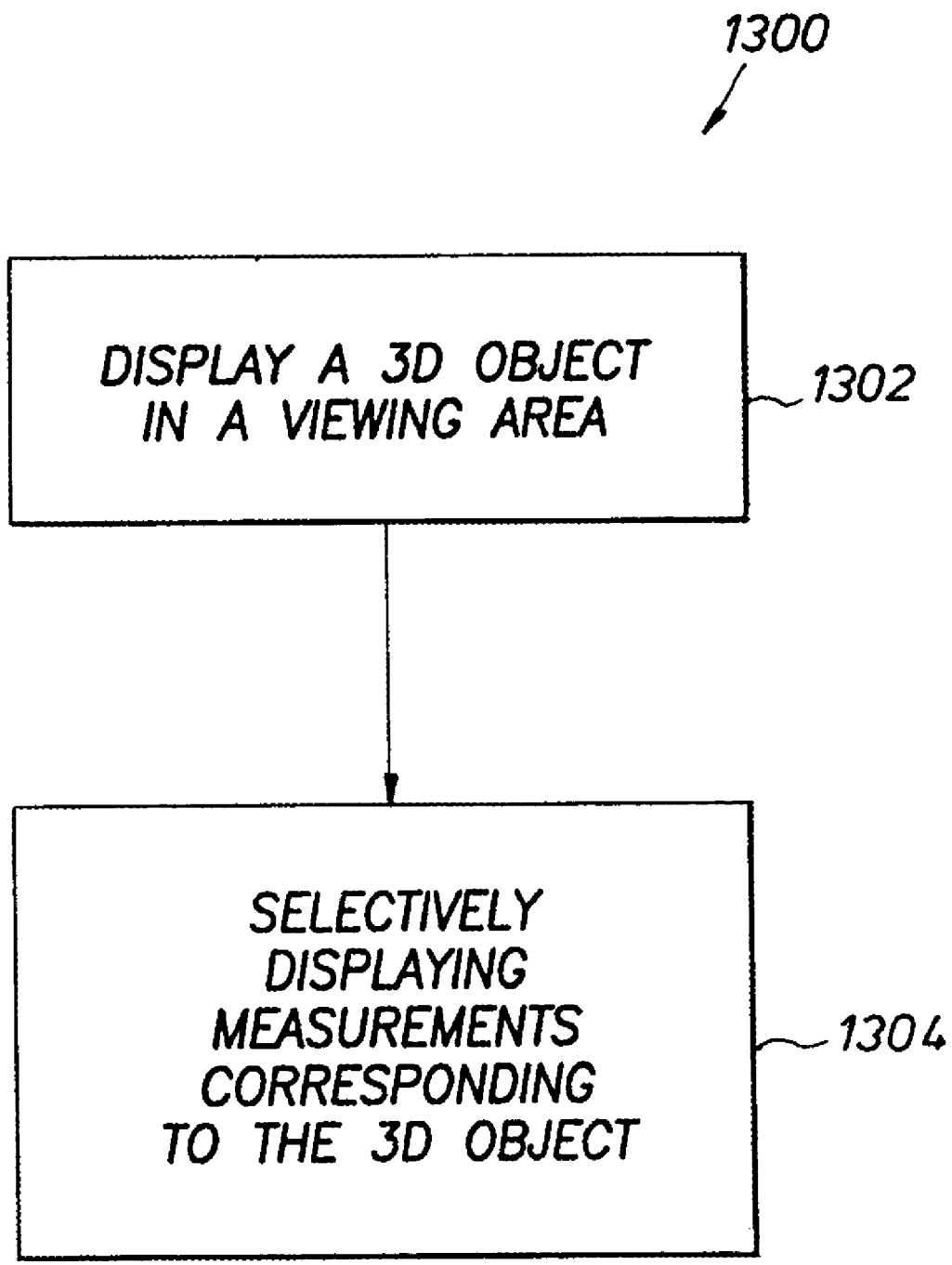
FIG. 13 shows a flow chart illustrating a method according to one embodiment of the invention.

FIG. 13 shows a flow diagram 1300 for displaying measurement information according to one embodiment of the invention. In step 1302, a 3D object is displayed in a viewing area. For example, the 3D object may be a model of a well trajectory. The size of the 3D model preferably relates to the actual dimension of the well trajectory. The surface of the 3D model preferably includes information (e.g., resistivity) related to the well trajectory.

In step 1304, data related to the well trajectory are then selectively displayed. The displayed data may be any well logging data. These data are preferably displayed in a manner such that the displayed data are shown at measurement depths (MD) corresponding to the measurement depths (MD) of the well trajectory. Each measurement data set may be displayed as a layer having a different radius from other layers such that each layer is concentrically offset from the previous layer. Alternatively, some of the layers may be displayed on the same layer with the same radius. In preferred embodiments, the radius of each displayed layer is user controllable.

The displayed measurement data may be encoded by different color schemes, gray scale, or different textual information. Also, any label or textual information may be displayed with different fonts, font colors, background colors, and font sizes to differentiate one type of measurement from another type of measurements (e.g., computer generated versus user-controlled, and depth versus width). The measurements displayed may be selectively turned on or off, or a graphical attribute (e.g., transparency) of the display may be changed. Furthermore, an additional measurement display layer may be added or an existing displayed layer may be removed from the currently displayed scene. In some embodiments, an angular section may be cutout to facilitate analysis involving many displayed layers.

Advantages of the present invention may include one or more of the following. In one or more embodiments, a 3D object is displayed with a plurality of measurements in multi-layer overlays. A user may simultaneously and selectively display the plurality of measurements pertaining to the same borehole. In one or more embodiments, a transparency of one or more of layers may be selectively adjusted to make multi-layers of relevant data visible to the user.

One or more embodiments of the invention permit a plane to be fit to characteristic features on multi-layer measurement data. This permits one to visually fit a plane (e.g., a dip plane) to multiple sets of measurement data simultaneously.

Some embodiments of the invention provide convenient methods for fitting dip planes. In one or more embodiments, a portion of a 3D object together with the multiple displayed layers is removed in the display. Accordingly, a layer profile view and a corresponding plurality of measurements may be simultaneously and selectively displayed to make relevant data visible to the user.

While the invention has been described using a limited number of examples, those skilled in the art, having the benefit of this disclosure, will appreciate that other variations are possible without departing from the scope of the invention as disclosed herein. Accordingly, the scope of the invention should be limited only by the attached claims.

What is claimed is:

1. A method for displaying a plurality of measurement data along a borehole trajectory, comprising:
    displaying a first layer of a borehole model, wherein the first layer represents a circumferential dimension of a borehole for a plurality of depths along the borehole trajectory; and
    displaying a second layer extending radially outward from the first layer, wherein the second layer represents at least one of the plurality of measurement data along the borehole trajectory.

2. The method of claim 1, further comprising:
    mapping measurement data on at least one selected from a group consisting of the first layer and the second layer of the borehole model.

3. The method of claim 1, further comprising:
displaying a third layer, wherein the third layer has a different diameter than the second layer.

4. The method of claim 3, wherein the different diameter represents a different depth of investigation.

5. The method of claim 1, wherein the first layer and the second layer are displayed in differing transparencies.

6. The method of claim 5, wherein the differing transparencies are set according to a selected function.

7. The method of claim 6, wherein the selected function is dependent on measurement values in the plurality of measurement data.

8. The method of claim 1, further comprising:
displaying a measurement value associated with a cursor location.

9. The method of claim 8, wherein the cursor location is user selected.

10. The method of claim 1, wherein the plurality of measurement data comprise well logging data.

11. The method of claim 10, wherein the well logging data comprise at least one selected from a group consisting of resistivity data, neutron measurement data, gamma ray measurement data, nuclear magnetic resonance data, and acoustic measurement data.

12. The method of claim 1, further comprising:
selectively displaying a portion of the borehole model and the first layer and the second layer by removing an angular section of the borehole model.

13. The method of claim 12, wherein the angular section is reference to a user coordinate.

14. The method of claim 1, wherein the first layer and the second layer are displayed in a cross-section view.

15. The method of claim 1, further comprising:
displaying a plane intercepting the borehole model.

16. The method of claim 15, wherein the plane is a dip plane.

17. The method of claim 15, further comprising:
adjusting the plane to fit a pattern of measurement values displayed on the first layer and the second layer.

18. A system for displaying a plurality of measurement data along a borehole trajectory, comprising:
a display;
a computer operatively coupled to the display, the computer having a program comprising instructions to enable:
displaying a first layer of a borehole model, wherein the first layer represents a circumferential dimension of a borehole for a plurality of depths along the borehole trajectory; and
displaying a second layer extending radially outward from the first layer, wherein the second layer represents at least one of the plurality of measurement data along the borehole trajectory.

19. The system of claim 18, wherein the program further comprises:
instructions to enable mapping measurement data on at least one selected from a group consisting of the first layer and the second layer of the borehole model.

20. The system of claim 18, wherein the program further comprises:
instructions to enable displaying a third layer, wherein the third layer has a different diameter than the second layer.

21. The system of claim 20, wherein the different diameter represents a different depth of investigation.

22. The system of claim 18, wherein the first layer and the second layer are displayed in differing transparencies.

23. The system of claim 22, wherein the differing transparencies are set according to a selected function.

24. The system of claim 23, wherein the selected function is dependent on measurement values in the plurality of measurement data.

25. The system of claim 18, wherein the program further comprises:
instructions to enable displaying a measurement value associated with a cursor location.

26. The system of claim 25, wherein the cursor location is user selected.

27. The system of claim 18, wherein the plurality of measurement data comprise well logging data.

28. The system of claim 27, wherein the well logging data comprise at least one selected from a group consisting of resistivity data, neutron measurement data, gamma ray measurement data, nuclear magnetic resonance data, and acoustic measurement data.

29. The system of claim 18, wherein the program further comprises:
instructions to enable selectively displaying a portion of the borehole model and the plurality of layers by removing an angular section of the borehole model.

30. The system of claim 29, wherein the angular section is reference to a user coordinate.

31. The system of claim 18, wherein the first layer and the second layer are displayed in a cross-section view.

32. The system of claim 18, wherein the program further comprises:
instructions to enable displaying a plane intercepting the borehole model.

33. The system of claim 32, wherein the plane is a dip plane.

34. The system of claim 32, wherein the program further comprises
instructions to enable adjusting the plane to fit a pattern of measurement values displayed on the first layer and the second layer.

* * * * *